March 27, 1934. B. W. JONES 1,952,171
MOTOR CONTROL SYSTEM FOR AUTOMATIC POISE DEVICES
Filed Sept. 3, 1931 2 Sheets-Sheet 1

Inventor
Benjamin W. Jones,
by Charles E. Mullen
His Attorney

March 27, 1934.  B. W. JONES  1,952,171
MOTOR CONTROL SYSTEM FOR AUTOMATIC POISE DEVICES
Filed Sept. 3, 1931  2 Sheets-Sheet 2

Inventor:
Benjamin W. Jones.
by Charles E. Muller
His Attorney.

Patented Mar. 27, 1934

1,952,171

UNITED STATES PATENT OFFICE 1,952,171

MOTOR CONTROL SYSTEM FOR AUTOMATIC POISE DEVICES

Benjamin W. Jones, Schenectady, N. Y., assignor to General Electric Company, a corporation of New York Application September 3, 1931, Serial No. 560,603

10 Claims. (Cl. 265—56)

My invention relates to motor control systems and more particularly to the control of an electric motor driving the balancing weight of a weighing machine and has for an object the provision of a simple, reliable and inexpensive control system which will quickly balance the machine.

Heretofore, automatic beam scales have been provided with an electric motor to drive a balancing weight along a beam arm, the direction of rotation of the motor being controlled by the position of the scale beam. No provision was made for slowing down the motor as the balancing weight reached a position corresponding to the balance of the scales. The result was often a seesawing action of the scale beam due to the motor driving the balancing weight to and fro across the balancing position and seldom stopping it in a position to balance the scales.

In carrying out my invention in one form I provide a weighing machine with means for controlling the speed of the motor driving the balancing weight in accordance with the unbalanced weight of the machine. I also provide an indicating mechanism which provides for the reading of the weight a predetermined time after the scale beam has been balanced.

Figure 1:
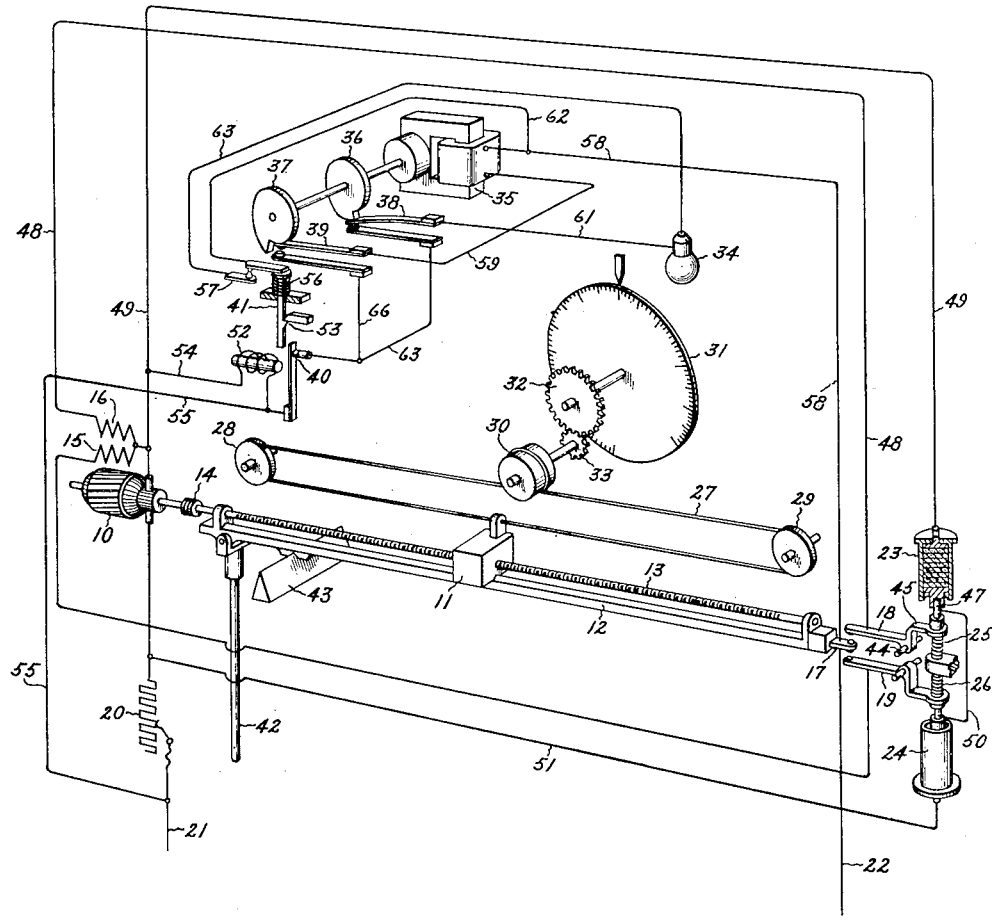
Figure 2:
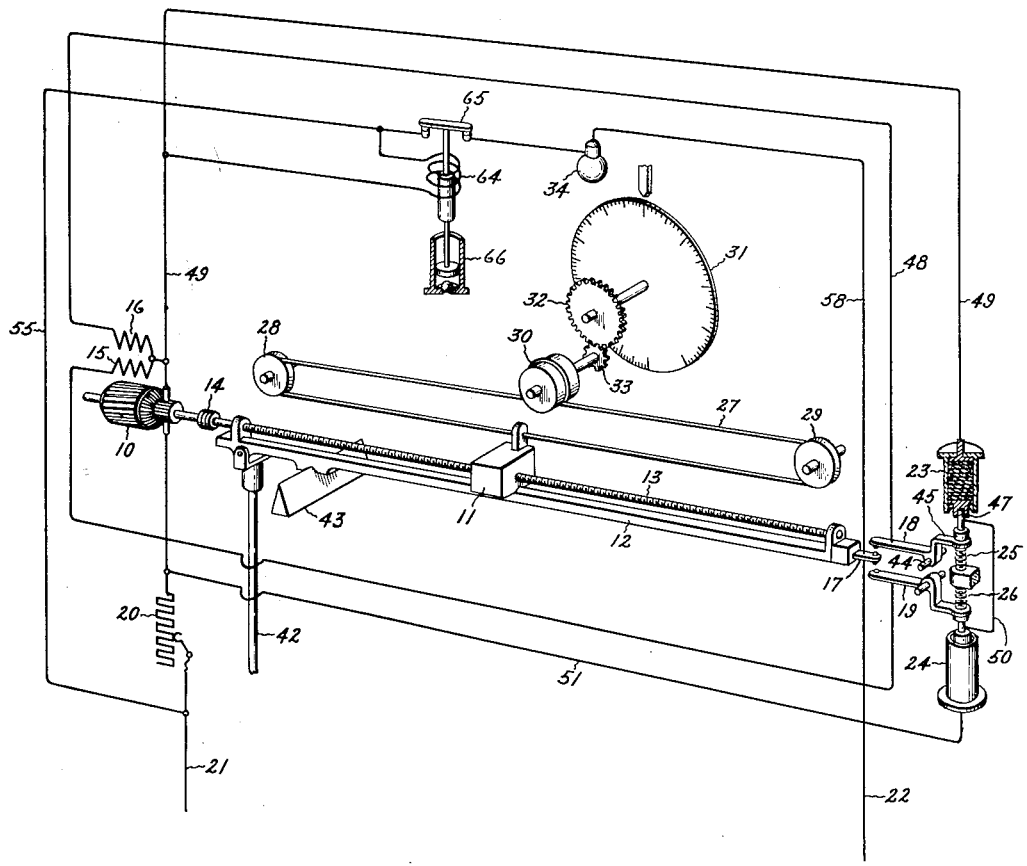
Figure 3:
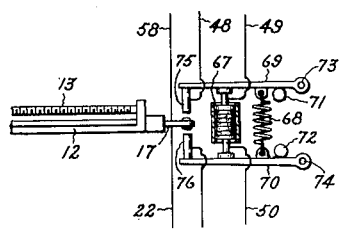

For a more complete understanding of my invention, reference should now be had to the drawing in which Fig. 1 illustrates diagrammatically my weighing and indicating machine; Fig. 2 shows a modification of the indicating mechanism for the scales, and Fig. 3 shows a modified form of construction of a variable resistance for controlling the speed of the motor.

Referring to the drawing, I have shown my invention in one form as applied to the control of a motor 10 which is connected to operate a balancing weight or poise 11 supported on the scale beam 12. The motor is of the universal type and may be operated on either direct current or alternating current. The balancing weight is provided with a threaded bore and cooperates with a threaded rod 13 rotatably carried by the scale beam. The motor shaft is directly connected to one end of the threaded rod 13 by means of a coupling 14. The motor 10 is provided with direction determining field windings 15 and 16 arranged to be selectively energized through the cooperation of the contact 17, fixed on the pendant end of the scale beam, with relatively fixed contacts 18 and 19. The armature of the motor 10 is connected through a resistance 20 to supply lines 21 and 22 energized from a suitable source of alternating current supply (not shown). Across the armature of the motor 10 there is connected speed controlling carbon pile resistors 23 and 24, normally compressed by compression springs 25 and 26, arranged so that the unbalanced weight on the scale beam decreases the pressure on the carbon piles thereby increasing the resistance. The resistance 20 serves to limit the amount of current which may flow through the armature and the carbon piles 23 and 24 so that practically all of the armature current is shunted through the carbon piles as the scale nears its balanced position. As the balancing weight 11 is driven to the balanced position, it drives, through a light weight cord 27 mounted on pulleys 28 and 29 and looped around a pulley 30, a dial 31 graduated in pounds or the like, by means of a gear 32 secured to the shaft of the dial 31 and meshing with a gear 33 secured to the shaft of the pulley 30. The dial 31 is arranged so that it is illuminated by a light 34 after the scale beam has been balanced. This is accomplished through the cooperation of a small self-starting synchronous motor 35, preferably of the type described and claimed in U. S. Letters Patent 1,495,936, H. E. Warren, and the sector cams 36 and 37 respectively arranged to close switches 38 and 39, together with a switch 40 and a spring-actuated plunger 41.

With the above understanding of the elements comprising an embodiment of my invention, the operation of the system itself will readily be understood from the detailed description which follows. It will be assumed that a heavy load has been placed on the platform of the scales (not shown) which causes a downward force to be applied to a link 42 connected to the end of the scale beam near a knife edge pivot 43. The pendant end of the scale beam carrying the contact 17 is thereby moved upwardly striking the relatively fixed contact 18. This contact is pivoted at 44 with an extension 45 encircling a pin 47 carrying the compression spring 25 so that the pressure applied to the contact 18 causes the extension 45 to move downwardly against the bias of the spring thereby decreasing the pressure on the carbon pile 23 and increasing its resistance. The engagement of the contacts 17 and 18 completes an energizing circuit for the armature of motor 10 and its field coil 16, which circuit may be traced from the supply line 22, contacts 17 and 18, conductor 48, the field coil 16 through the armature of motor 10 and the resistance 20 to the other side of the line. The field coil 16 thereupon produces a flux on the motor 10 in a direction to cause the armature to rotate in a direction to drive the balancing weight 11 to the free end of the scale beam. Inasmuch as the normally compressed carbon pile resistors 23 and 24 are in shunt with the armature of the motor 10, as indicated by the circuit which may be traced from one side of the motor armature by conductor 49 to the carbon pile 23, thence by conductor 50 to carbon pile 24 and by conductor 51 to the other side of the motor armature, the voltage applied to the motor and consequently its speed is dependent upon the resistance of the carbon pile resistance. Increasing the resistance of the shunt resulting from the extension 45 acting against the spring 25 causes a higher voltage to be applied to the armature thereby increasing the speed of the motor. As the balancing weight moves towards the balancing position, however, this pressure is gradually diminished, permitting the spring 25 to decrease the resistance of the carbon pile and hence decreases the speed of the motor 10. It will thus be observed that the motor 10 will drive the balancing weight very slowly as the scale beam nears its balanced position so that as the scale beam 12 balances, disengaging the contacts 17 and 18 and thereby breaking the circuit to the motor, the result is an instant stoppage of the balancing weight 11 in the balanced position.

It will of course be understood that if a light load is applied to the scale platform (not shown) the balancing weight in the position shown would move the contact 17 against the contact 19 constructed similarly to the contact 18 so that the resistance of the carbon pile 24 is increased by the decrease in pressure. It will be seen that the motor's speed or the speed of the balancing weight is always a function of the unbalanced weight applied to the scale beam.

Again assuming that a heavy load has been applied to the scale platform thus moving the contact 17 against the contact 18, the operation of my indicating means is as follows: Inasmuch as the operating coil 52 of the normally closed switch 40 is connected by the conductor 54 to one side of the armature of the motor 10, and by the conductor 55 to the supply line 21, the establishment of the motor connections causes current to flow through the operating coil 52 thereby opening the switch 40, the armature of said switch being arranged to strike the lower end of the spring-actuated plunger 41, and to release it from the catch 53, so that it is urged upwardly by the spring 56 closing the switch 39 and opening the switch 57, which switch is operated by the plunger 41. As soon as the scale beam is balanced and the motor 10 is deenergized, the operating coil 52 is also deenergized, thus permitting the switch 40 to close. An energizing circuit is thereby completed for the telechron motor 35, which circuit may be traced from the supply line 22 by conductor 58 to the teleschron motor, conductor 59, switch 39, conductor 66, switch 40 and by conductor 55 to the other supply line 21. The telechron motor 35 thereupon begins to rotate the sector cams 36 and 37 in a clockwise direction. The cam 37 acting through the contacts of the switch 39 is arranged to depress the spring-actuated plunger 41 to its initial position in engagement with the catch 53 and with the switch 57 closed. It will thus be observed that as the telechron motor 35 rotates the cams, the cam 37 by reason of its shape after a rotation of substantially 355 degrees will have forced the plunger 41 downwardly to the latched position closing the switch 57. By reason of the shape of the cam 36, the switch 38 is closed after a rotation of substantially 355 degrees thereby establishing an energizing circuit for the light 34, which circuit may be traced from the supply line 22, conductor 58, conductor 62, switch 57, conductor 63, through the lamp 34, conductor 61, switch 38, conductor 66, switch 40, by conductor 55 to the other supply line 21. When the cam 37 has been rotated 360 degrees, it permits the switch 39 to open, thus deenergizing and stopping the telechron motor 35. Inasmuch as the cam 36 is still holding the switch 38 closed, the light remains on to permit the reading of the indicating scale 31. It will be observed that all of the parts are now in readiness for another cycle of operation which may be initiated by the loading of the scale platform.

In Fig. 2, I have shown a modified form of control means for the light 34 serving to illuminate the indicating dial 31. The other parts operating as described in connection with Fig. 1 and similar reference numerals identifying similar parts, it will be observed that an operating coil 64 of a timing switch 65 is connected across the motor armature and the fixed resistance 20 so that the operating coil 64 opens the switch 65 whenever the motor 10 is energized. A dashpot 66 is arranged to permit the free opening of the switch 65 and to introduce a time interval for its closing operation. As I have stated, the operating coil 64 holds the switch 65 open as long as the motor 10 is energized for the balancing of the scales. As soon as the scale beam 12 is balanced the motor is deenergized and consequently the coil 64 is deenergized. The switch 65 after a predetermined time interval introduced by the dashpot 66 thereupon closes, establishing an energizing circuit for the lamp 34, which circuit may be traced from the supply line 22 to conductor 58, lamp 34, switch 65 and by conductor 55 to the other supply line 21. As before, it will be observed that the lamp illuminates the indicating dial 31 only a predetermined time after the scale beam 12 reaches its balanced position.

Instead of using two carbon pile resistors 23 and 24 as shown and described in connection with Figs. 1 and 2, a single pressure responsive resistance may be connected in shunt with the armature of the motor 10, such a resistance being shown in Fig. 3. A carbon pile 67 is normally compressed by a tension spring 68 secured at each end to the pivoted contact levers 69 and 70, the levers transmitting the pressure exerted by the tension spring 68 against the carbon pile. To limit the movement of the levers, there are provided stops 71 and 72 positioned adjacent the respective pivot points 73 and 74 of the levers 69 and 70. The free ends of the levers 69 and 70 carry contact members 75 and 76 which cooperate with the contacts 17 fixed on the free end of the scale beam 12 to control the energization and direction of rotation of the motor 10. If the unbalanced weight on the scale beam 12 tends to move the contact 17 against the contact 75, the unbalanced weight will be applied to the lever 69 moving it upwardly and inasmuch as the arm 70 strikes the stop 72 preventing further movement of the arm 70, the effect is to diminish the pressure applied on the variable resistance 67, the result of which is an increase in the speed of the motor, which increase is proportional to the unbalanced weight on the scale beam. It will of course be understood that the speed of the motor is likewise controlled if the unbalanced weight tends to move the contact 17 downwardly against the fixed contact 76.

While I have shown a particular embodiment of my invention, it will be understood of course that I do not wish to be limited thereto since many modifications may be made, and I therefore contemplate by the appended claims to cover any such modifications as fall within the true spirit and scope of my invention.

What I claim as new and desire to secure by Letters Patent of the United States, is,—

1. Means for balancing a beam scale provided with a beam arm and a driven balancing weight, comprising a motor for driving said balancing weight towards a balancing position, a carbon pile resistance responsive to the unbalanced weight of said beam arm, connections for connecting said carbon pile resistance in circuit with said motor so as to vary continuously the speed of said motor in accordance with said unbalanced weight, and means for deenergizing said motor when said balancing weight arrives at said balancing position.

2. In combination, a beam scale provided with a beam arm and a driven balancing weight, a motor for driving said balancing weight towards a scale-balancing position, and pressure responsive means associated with said beam arm and acted upon by said beam arm for continuously and uniformly varying the speed of said motor in accordance with the pressure of said beam arm on said means.

3. In combination, a beam scale provided with a beam arm and a driven balancing weight, a motor for driving said balancing weight towards a scale-balancing position, a carbon pile resistance connected in shunt with the armature of said motor, biasing means normally maintaining said carbon pile resistance under compression, and means responsive to the unbalanced weight for operating said biasing means to decrease the compression of said resistance so that the speed of said motor varies in proportion to the unbalanced weight.

4. Means for balancing a beam scale provided with a beam arm and a driven balancing weight, comprising a motor for driving said balancing weight towards the balancing position, and a carbon pile resistance responsive to the unbalanced weight of said beam arm for varying the speed of said motor in accordance with said unbalanced weight.

5. An automatically balanced scale having an indicator presented for reading from an observer's position, a light source positioned to illuminate said indicator, and timing means responsive to the balanced position of said scale for controlling said illumination from said light source so that said indicator is only illuminated for a reading a predetermined time after said scale has been balanced.

6. In a beam scale including a beam arm and an automatically movable poise controlled in accordance with the unbalanced weight on said beam arm, the combination with an indicator, illuminating means for said indicator, a relay responsive to the balance of said beam arm for controlling said illuminating means, and time delay means modifying the action of said relay so that said indicator is only illuminated after said beam arm has been balanced.

7. In combination with a weighing machine of the type wherein the weighing operation is performed by balancing counterpoised known and unknown weights, of motor means for moving one of them to a balancing position, an indicator presented for reading from an observer's position, a light source positioned to illuminate said indicator, timing means initiated by the balancing of said machine for controlling the said illumination from said light source comprising a motor, means for energizing said motor when said machine is balanced, means for deenergizing said motor after a predetermined rotation of the motor armature, and means for illuminating said indicator after a predetermined rotation of said motor armature whereby a time interval is introduced between the time the machine is balanced and said indicator is illuminated.

8. An automatically balanced beam scale having an indicator presented for reading from an observer's position, a light source positioned to illuminate said indicator, timing means responsive to the balanced position of said scales for controlling the said illumination from said light source comprising a motor, timing cams driven thereby for operating energization controlling switches, a relay responsive to the balancing operation of said beam scale for deenergizing said motor, the said relay cooperating with one of said cam operated switches to energize said motor when said scale has been balanced, the other of said cams closing the other of said switches after a predetermined rotation of said motor to illuminate said indicator from said light source.

9. In combination, a beam scale provided with a beam arm and a driven balancing weight cooperatively associated therewith, a motor for driving said weight towards a scale-balancing position, members providing stops for restricting the movement of said beam arm, and pressure responsive means associated with each of said members for controlling the speed of said motor in accordance with the pressure of said beam arm against said members.

10. Means for balancing a beam scale provided with a beam arm and a driven balancing weight, comprising a motor for driving said balancing weight towards a scale-balancing position, a pair of carbon pile resistances associated with said beam arm, connections for connecting said resistances in parallel with the armature of said motor, biasing means normally maintaining said resistances under compression, a pair of levers arranged to be engaged by said beam arm in accordance with the unbalanced weight for operating said biasing means to vary the compression of one or the other of said resistances whereby the speed of said motor is controlled in accordance with the unbalanced weight for either direction of rotation.

BENJAMIN W. JONES.